(12) United States Patent
Blanchard

(10) Patent No.: US 6,269,617 B1
(45) Date of Patent: Aug. 7, 2001

(54) LAWN MOWER WITH LASER CUTTING APPARATUS

(76) Inventor: Daniel R. Blanchard, 230 County Farm Rd., Jonesborough, TN (US) 37659

( * ) Notice: Subject to any disclaimer, the term of this patent is extended or adjusted under 35 U.S.C. 154(b) by 0 days.

(21) Appl. No.: 09/574,364

(22) Filed: May 19, 2000

(51) Int. Cl.$^7$ .................................................. A01D 69/00
(52) U.S. Cl. .................... 56/1; 219/121.74; 219/121.76; 219/121.67
(58) Field of Search .................. 572/55–60; 219/121.74, 219/121.8, 121.78, 121.76, 121.68; 56/1, 11.9

(56) References Cited

U.S. PATENT DOCUMENTS

| | | | |
|---|---|---|---|
| 2,750,712 | * 6/1956 | Rainey | 47/1.3 |
| 3,652,844 | 3/1972 | Scott, Jr. | |
| 4,338,744 | 7/1982 | Gilmore | |
| 4,393,505 | * 7/1983 | Fahlen | 372/57 |
| 4,461,947 | * 7/1984 | Ward | 219/121 |
| 4,952,222 | 8/1990 | Tobias | |
| 5,225,650 | * 7/1993 | Babel et al. | 219/121.69 |
| 5,352,221 | * 10/1994 | Fumich | 606/15 |

* cited by examiner

Primary Examiner—Robert E. Pezzuto
Assistant Examiner—Árpád Fábián Kovács
(74) Attorney, Agent, or Firm—Pitts & Brittian, P.C.

(57) ABSTRACT

A cutting apparatus including a plurality of rotating laser beams for cutting vegetation. The apparatus comprises a housing including side walls being extended generally perpendicular to form a downwardly oriented opening. An electrically powered laser cutting device is rotatably positioned centrally within the housing. A transport device is connectable to the housing to provide movement of the housing and laser cutting device along a surface covered by vegetation. The laser cutting device generates at least one laserbeam that is continuously rotatable in a 360° arc underneath the housing, with the at least one laser beam being adjustable in angular direction to direct laser beams in a plurality of angles arcing downwardly across the vegetation being cut. The speed of rotation of the one or more laser beams increases proportionally as ground speed increases for the cutting apparatus to provide adequate cutting of surface area in proportion to the ground speed across the vegetation. A plurality of rotating pairs of laser beams can be generated and separately angled downward at angles other than horizontal, providing cutting paths across the vegetation at different heights during each rotation, thereby creating variable length cut vegetation that provides aesthetics for the cut vegetation, and provide clippings of variable lengths for improved mulching and decomposition of the cuttings.

17 Claims, 4 Drawing Sheets

LAWN MOWER WITH LASER CUTTING APPARATUS

BACKGROUND OF INVENTION

1. Field of Invention

The invention relates to an apparatus and method for cutting vegetation. More specifically, the invention relates to an apparatus and method for cutting vegetation with focused laser beams.

2. Description of the Related Art

Prior mowing devices include gasoline powered motors driving rigid, moving cutting blades operated by a series of drive spindles, belts, drive shafts, and gearing devices. Prior rotating cutting blades require periodic sharpening of the blades and periodic replacement due to impact with rocks and the ground. The power producing motors and cutting blades require speed limitations imposed by industry safety standards on the engine and/or blade rotation mechanisms to limit blade tip speeds as a function of the length of the mower blade as a safety measure for limiting the damages to adjacent objects or the operator when blades impact and shatter against hard objects. Therefore, if the speed of travel of the mowing device increases past a certain ground speed along the surface being mowed, the rotating blades will not increase proportionally in rotational speed so the effective cutting of all standing grass may diminish at high ground speeds. Commercial mowing operations would benefit from a cutting apparatus that incorporates a cutting means that increases in rotational speed as the ground speed increases, with no limitation to the rotational speed of the cutting means.

The gasoline powered motors and rotating cutting blades are noisy when operated, and are relatively heavy and cumbersome to operate due to the weight of the motors, drive spindles, belts, chains, and rotating cutting blades. If adjustable heights of blades are needed to provide for a mulching effect, the rotating cutting blades must be maneuvered manually to a different cutting height, or multiple passes are required over the vegetation to produce smaller sized clippings for effective mulching of the vegetation.

An example of the prior art is U.S. Pat. No. 4,952,222, issued to Tobias, which discloses a grass cutting device with an electrically activated energy path such as strands of wires between spaced electrodes that intersect blades of grass and sears off the grass tips at the contact points. The strands of wires or electrodes are supported by a support means adapted to rest on or in close proximity to the ground. The device also discloses a method of grass cutting including establishing a grass cutting energy path at a location proximate the ground for severing the upper portions of grass blades. The grass cutting energy path can alternatively include a laser having a laser beam path directed by generally stationary mirrors to extend the laser beam path horizontally within the mower housing between mirrors at a location parallel to the ground. The laser beam may be diminished in intensity and misdirected by reflections off of vibrating mirrors within the mower housing, and may be deflected by the multitude of wet or dry grass blades within the laser beam path as the beam is directed parallel to the ground between mirrors and reflectors.

Another example of the prior art is U.S. Pat. No. 4,338,744, issued to Gilmore, which discloses a weed destroying system having electrodes for contacting weeds adjacent rows of crops along which the vehicle travels. The vehicle includes a high voltage generator for supplying high voltage to the electrodes. The weed destroying system includes a safety system to minimize the possibility of electrical shock hazards to the operators.

Another example of the prior art is U.S. Pat. No. 3,652,844, issued to Scott, Jr., which discloses a method and apparatus for destroying weeds and other plants by application of a pulsed laser beam directed onto vegetation by a diverging mirror arrangement. The laser beam is directed horizontally or vertically onto aquatic vegetation to be destroyed by a pulsed laser unit such as a $N_2$—$CO_2$—He laser focused onto an arrangement of mirrors adjusted by a mechanical means for focusing the laser beam. The weed destroying system produces cellular damage by build-up of heat within the aquatic vegetation on which the pulsed laser beam is focused.

A need exists in the vegetation control industry for a reliable, portable cutting apparatus that cuts vegetation at different heights during passage over the vegetation, that does not generate excess noise, and that includes a minimum of moving parts.

Therefore, it is an object of the present invention to provide a cutting means for cutting vegetation at different heights during rotation of the cutting means.

It is another object of the present invention to provide an apparatus having a cutting means rotatable at increasing speeds in proportion to the speed of the apparatus along the surface covered by vegetation.

It is another object of the present invention to provide an apparatus having a cutting means that includes a minimum of belts and rotating blades.

It is another object of the present invention to provide an apparatus having a cutting means that does not generate excess noise and minimizes use of moving blades.

It is another object of the present invention to provide a method for operating a cutting means for cutting vegetation at different heights during each passage of the cutting means.

It is another object of the present invention to provide a method for operating a cutting means for cutting vegetation into small clippings of different lengths for improved mulching of the cut vegetation.

BRIEF SUMMARY OF INVENTION

An apparatus for cutting vegetation, and a method for operating the apparatus, is disclosed with the apparatus being controlled by a user for movement at variable ground speeds along a surface covered by vegetation for cutting the vegetation with a laser cutting means that is adjustable to project laser beams at a plurality of angles. The apparatus comprises a housing including a first surface having side walls being extended generally perpendicular and downwardly from the first surface, the side walls having interior surfaces faced inwardly. The housing includes a second surface opposite the first surface, and includes a downwardly oriented opening bounded by the side walls. The cutting apparatus includes a laser cutting means being electrically powered, with the laser cutting means being rotatably positioned on the second surface of the housing. A control means is positioned proximate the housing with the laser cutting means being controlled by the control means for speed of rotation of the laser cutting means. Electrical power is provided to the laser cutting means by a power means being detachably connected to the housing, with the power means being a rechargeable battery and/or a gasoline powered electrical generator. A transport means is connectable to the housing, the transport means provides movement of the housing and the laser cutting means along the surface covered by vegetation. The transport means can include a push mower configuration having a plurality of pairs of wheels connectable to the housing, or a tractor platform having drive wheels and guide wheels, or a support frame and harness for attachment to the housing and for carrying by the user as a maneuverable hand-held vegetation cutting apparatus.

The laser cutting means includes a laser beam generator being rotatable underneath the housing with the laser beam generator being adjustable in angular direction. At least one laser beam is generated by the laser beam generator which is continuously rotatable in a 360° arc while being operated by the user during cutting vegetation operations. The at least one laser beam can be directed in a plurality of angles arcing downwardly onto vegetation proximate the opening of the housing. A plurality of light absorbing materials are positioned against the interior of the side walls and the second surface to absorb errant laser beams generated by the rotatable laser beam generator.

The control means includes an electrical interface positioned proximate to the upper surface of the housing, with the electrical interface providing user control of the rotatable movement of the laser beam generator, providing user control of the intensity of the rotatable laser beam, and providing user control of the angled direction of the rotating laser beam. A plurality of laser beams can be generated simultaneously by the laser beam generator with user manipulated controls being positioned proximate the position of the user in relation to the transport means. The speed of rotation of the laser beam generator can be automatically increased as the ground speed of the cutting apparatus increases to increase the rotation of the laser beams to cut vegetation in proportion to the speed of travel across the surface covered by vegetation.

The constantly rotating laser beam or rotating plurality of beams can be separately angled downward at angles other than horizontal, provide a cutting apparatus that cuts vegetation at different heights during each rotation, thereby creating short and variable length clippings that provide improved aesthetics for the cut vegetation and improved mulching and decomposition of the cuttings. The laser cutting means of the apparatus operates with reduced noise due to a lack of rotating cutting blades, and operates with a reduced number of moving mechanical parts thereby reducing maintenance requirements.

BRIEF DESCRIPTION OF SEVERAL VIEWS OF DRAWINGS

The above-mentioned objects and advantages of the present invention are readily apparent from the description of the invention contained herein, and by reference to the claims, read together with the drawings in which:

DETAILED DESCRIPTION OF THE INVENTION

Figure 1:
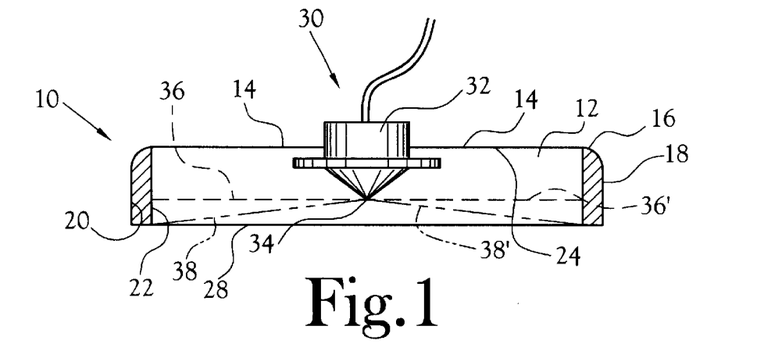
FIG. 1 is a side view of an apparatus for cutting vegetation, illustrating a rotatable laser cutting means positioned within a housing of the present invention.

In accordance with the present invention, there are provided both an apparatus for improved cutting of vegetation, and a method for operating the apparatus. The cutting apparatus is movable by a user at various ground speeds along a surface covered by vegetation for cutting the vegetation with a laser cutting means that is adjustable to project focused laser beams outwards at a plurality of angles for cutting and trimming vegetation. FIG. 1 illustrates an improved cutting apparatus 10 that includes a housing 12 having a first surface 14 with a perimeter 16 being either circular or multi-sided. Attached to the perimeter 16 is a generally continuous side wall 18, either circular (see FIG. 2), or multi-sided as an four or six-sided housing 12 (not shown). The side wall 18 is extended generally perpendicular around the perimeter 16, and generally downward from the first surface 14. The generally continuous side wall 18 includes an interior surface 20 faced inwardly toward a generally central position 26 within the interior of housing 12. The interior surface 20 can include a laser light absorbing material 22 attached thereon, for absorbing and containing errant laser beams. The housing includes a second surface 24 opposite the first surface 14, the second surface 24 and the continuous side wall 18 enclose an interior that opens at a downwardly oriented opening 28 bounded by the continuous side wall 18. The second surface 24 can include a laser light absorbing material 22 attached thereon.

The cutting apparatus includes a laser cutting means 30 that can be electrically powered, with the laser cutting means 30 being connectable at a central position 26, and extending downward from the second surface 24 underneath the housing 12. The laser cutting means 30 includes a laser beam generator 32 and an end section 34 being oriented a sufficient distance below the second surface 24 to allow for full rotation in a 360° arc of the end section 34 of the laser beam generator 32. An alternative embodiment provides for full rotation in a 360° arc of the laser beam generator 32 and end section 34. At least one laser beam 36 is transmitted generally radially outwards (see FIG. 2) from the end section 34 of laser beam generator 32, which includes an adjustment means (not shown) known to those skilled in the art for angular adjustments of the at least one laser beam 36 transmitted outwards in a first angular direction 38, 38' (see FIG. 1), and/or in a second angular direction 40,40' being generally downward toward opening 28 (see FIGS. 1 and 3).

The at least one laser beam 36 is generated by the laser beam generator 32 which is continuously rotatable in a 360° arc 42 either clockwise or counter-clockwise, or a combination of the two directions, while being controlled by the user during vegetation cutting operations. The at least one laser beam 36 can be directed in a plurality of angles 38, 40 downward, onto, and across the tops of vegetation projecting into the opening of the housing. A plurality of light absorbing materials 22 are positioned against the interior surfaces 20 of the plurality of side walls 18 and against the second surface 24 to absorb errant laser light beams generated by the rotatable laser beam generator 32. Due to the plurality of angles 38, 40 that the at least one laser beam 36 can be directed, the vegetation ends are cut at varying heights which improves mulching and decomposition of cuttings.

Figure 2:
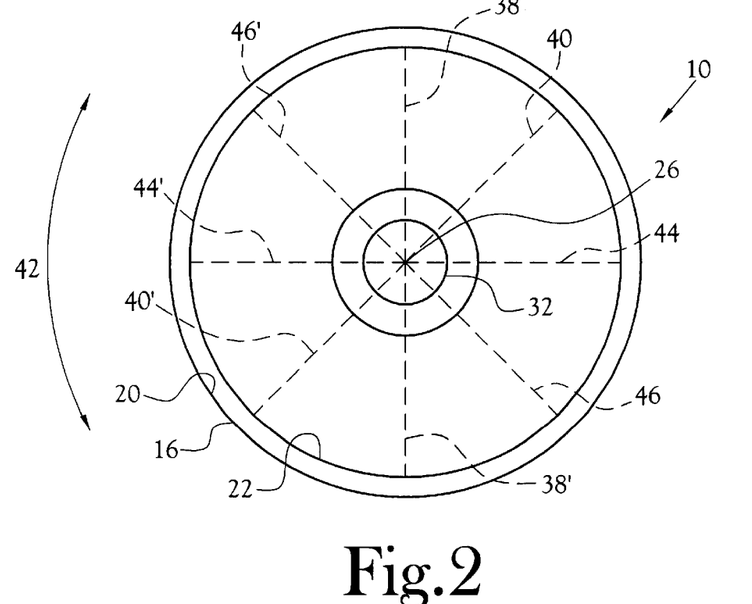
FIG. 2 is a top view of the rotatable laser cutting means of FIG. 1.
Figure 3:
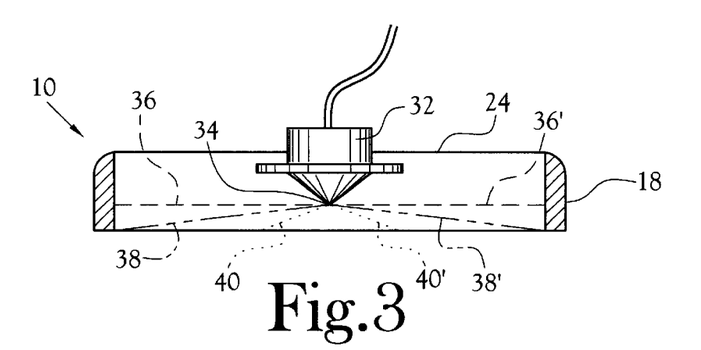
FIG. 3 is a detailed side view of the rotatable laser cutting means illustrating a plurality of laser beams being angled radially outwards and downwards within the housing.

The at least one rotatable laser beam 36 configuration can include alternative embodiments, including a second embodiment having at least two opposed laser beams (not shown), or a third embodiment having four pairs of opposed laser beams 38 and 38', 40 and 40', 44 and 44', 46 and 46' at a plurality of angles (see FIGS. 2 and 3). A fourth embodiment can have up to about twelve pairs of opposed laser beams (not shown), with each pair of opposed laser beams generated at different intensities and at a plurality of angles. For any of the embodiments having at least two or more pairs of rotatable laser beams, one or two of the pairs of laser beams can be rotated in about an eighteen inch diameter arc, and one or two separate pairs of laser beams can be rotated in about a twenty-two inch diameter arc. By providing a plurality of pairs of opposed laser beams being rotated at different diameters, the improved cutting apparatus 10 cuts the ends of vegetation such as grass, weeds, or other vegetation at varying heights which improves the mulching and decomposition of the grass cuttings, and cuts the harvested crops at multiple heights so that the tops of the harvested crops can be retrieved, while the lower stalks are cut and left in the field to decompose.

An improved feature of the improved cutting apparatus 10 is that the speed of rotation and the intensity of the at least one or more laser beams is not limited to a certain constant rotation speed, or limited to only one cutting height during each rotation. The speed of rotation of each laser beam 36 in whatever angular direction 38, 40 transmitted from the laser beam generator 32 can be increased in direct proportion to the ground speed of the mowing housing 12 and transport means 72. Upper rotational speed limits for the variable speed of rotation of each laser beam can be limited only by the physical limits of rotation of the mechanical parts of the cutting apparatus, as determined by those skilled in the art. Therefore, as the ground speed of the transport means 72, such as a lawn and garden tractor 74 or user-pushed mower 76, is accelerated then the rotational speed and the intensity of each laser beam can be increased to ensure that the blades of vegetation contacted by the laser beams are cut consistently at appropriate heights determined by the angular direction 38, 40 of the laser beams. The prior grass mowing devices have speed limitations imposed by industry safety standards on the engine and/or blade rotation mechanism to limit blade tip speeds as a function of the length of the mower blade as a safety measure. The cutting height of each rotating laser beam can be adjusted by the operator so that different cutting heights, at various diameters from the rotating laser beam generator 32, are attainable by adjusting the angular direction of each of the plurality of laser beams 38, 40, 44, 46 generated by the laser beam generator 32 centrally positioned in each housing.

For the present invention, if the laser beams that are emitted at a plurality of angles 38, 40, 44, 46 from the cutting apparatus 10 are misdirected by rocks or other reflective non-vegetative objects, the scattered laser beams are absorbed by the laser beam absorbing materials 22. Errant laser beams are contained within the housing 12 and the rotational speed of the laser beam(s) does not require limiting as a function of ground speed as a safety measure. Therefore, an advantage of the improved cutting apparatus 10 is that when the transport means 72 is accelerated in ground speed then the rotational speed and the intensity of each laser beam can be increased in proportion to ensure that the vegetation contacted by the laser beams are cut at appropriate heights across a width of the cutting path no matter the ground speed of housing 12 and laser beam generator 32.

A system control means 52 is positioned proximate the housing 12, either attached on the first surface 14 or attached on user operated control arms (not shown). The laser cutting means 30 is controlled by electronic circuitry within, and/or connectable to, the system control means 52 which measures ground speed of the transport means 72, the angular directions 38, 40 of the laser beam(s), and other operating parameters of the laser beam generator 32. The user is able to override the circuitry to adjust the speed of rotation of the at least one laser beam 36 and/or the intensity of each pair of laser beams, and/or the angular direction 38, 40 of one or more of the laser beams as the cutting apparatus 10 is transported across the vegetation to be cut. The system control means 52 can include a ground speed indicator (not shown) and electrical circuitry that is known to those skilled in the art to adjust the speed of rotation of the laser beams in proportion to changes in the ground speed of the cutting apparatus 10. If a plurality of laser beams are generated simultaneously by the laser beam generator, the user manipulated control means 52 is positioned proximate the position of the user in relation to the transport means 72.

Figure 5:
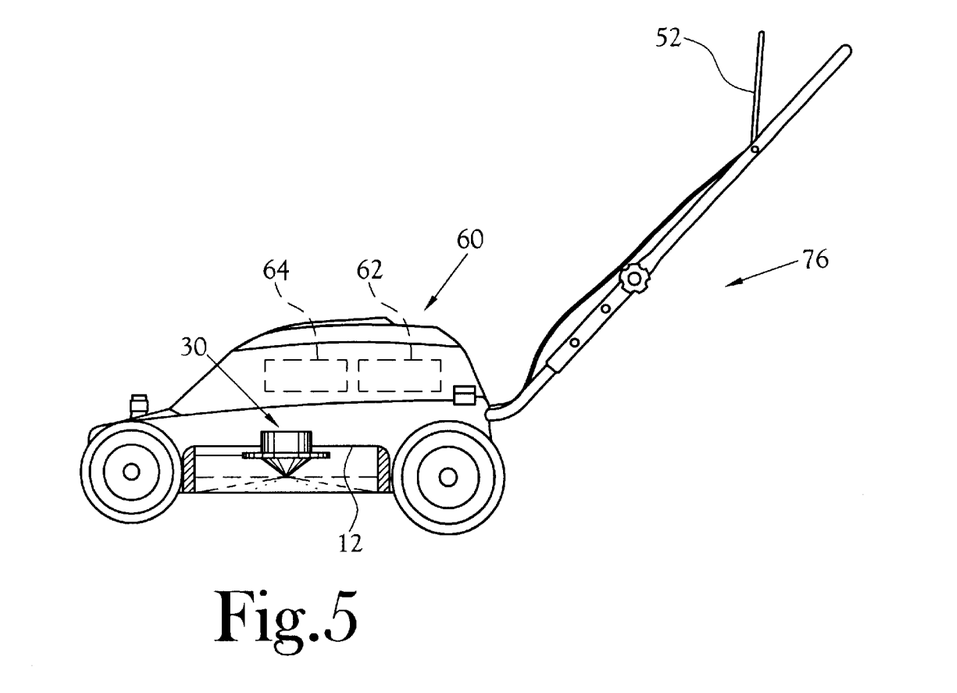
FIG. 5 is a side view of an alternative mowing platform for transporting the rotatable laser cutting means along a surface covered by vegetation.
Figure 6:
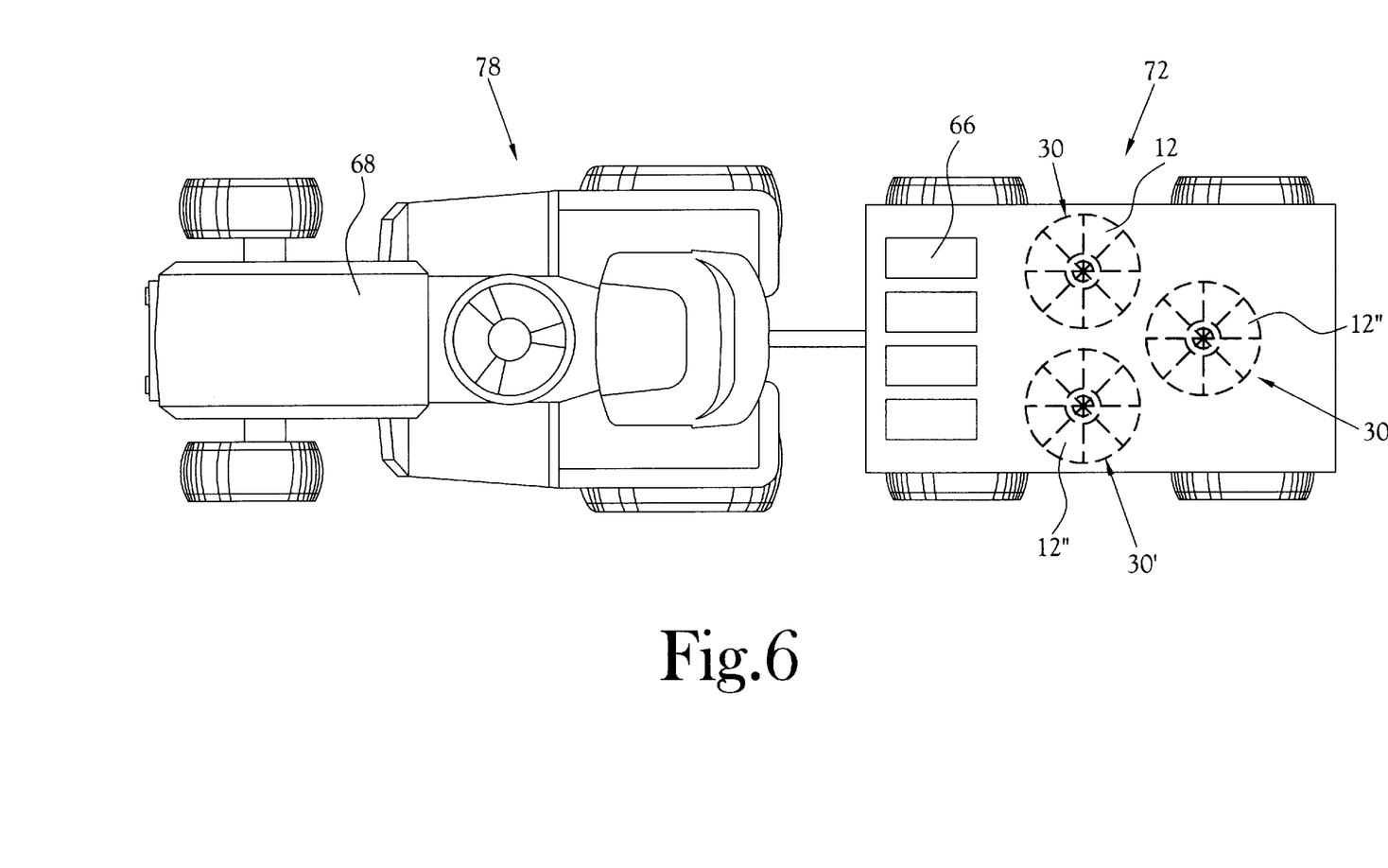
FIG. 6 is a top view of an alternative mowing platform for transporting the rotatable laser cutting means along a surface covered by vegetation.

Electrical power can be provided to the laser cutting means 30 by an electrical power means 60 (FIG. 5) being detachably connected to the housing 12, with the electrical power means being a plurality of rechargeable batteries (not shown), and/or an electrical generator 62 operated by a power generation means 64 that also provides power to drive the wheels of the tractor 78 pulling the transport means 72 (see FIG. 6). The electrical generator 62 provides electrical power of about 110 volts to operate the laser beam generator 32. For a plurality of batteries provided, the batteries may be rechargeable batteries known to those skilled in the art.

Figure 4:
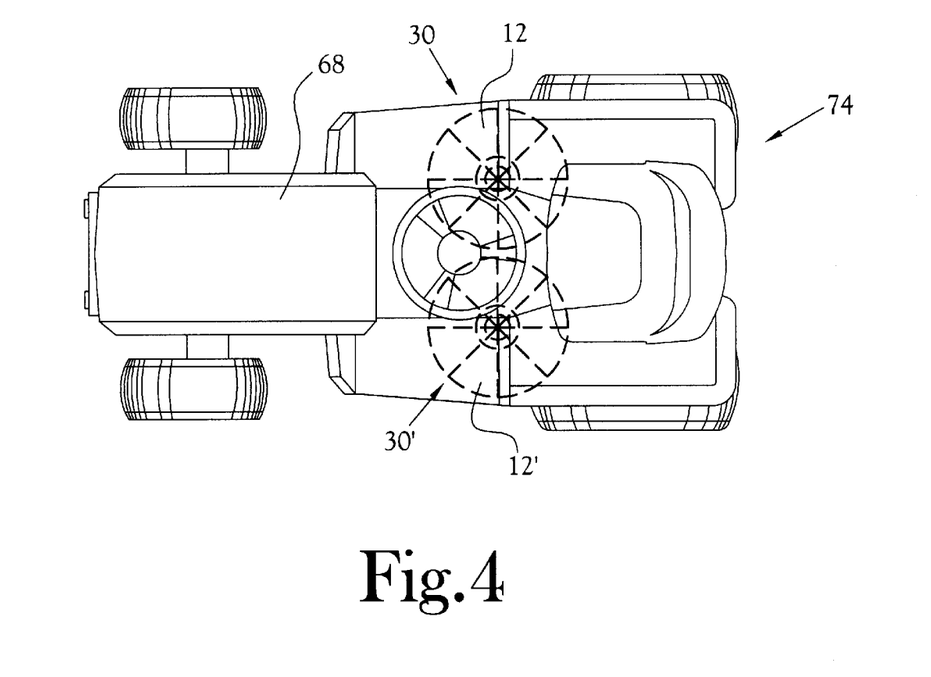
FIG. 4 is a perspective view of one embodiment of a mowing platform for transporting the rotatable laser cutting means along a surface covered by vegetation.
Figure 7:
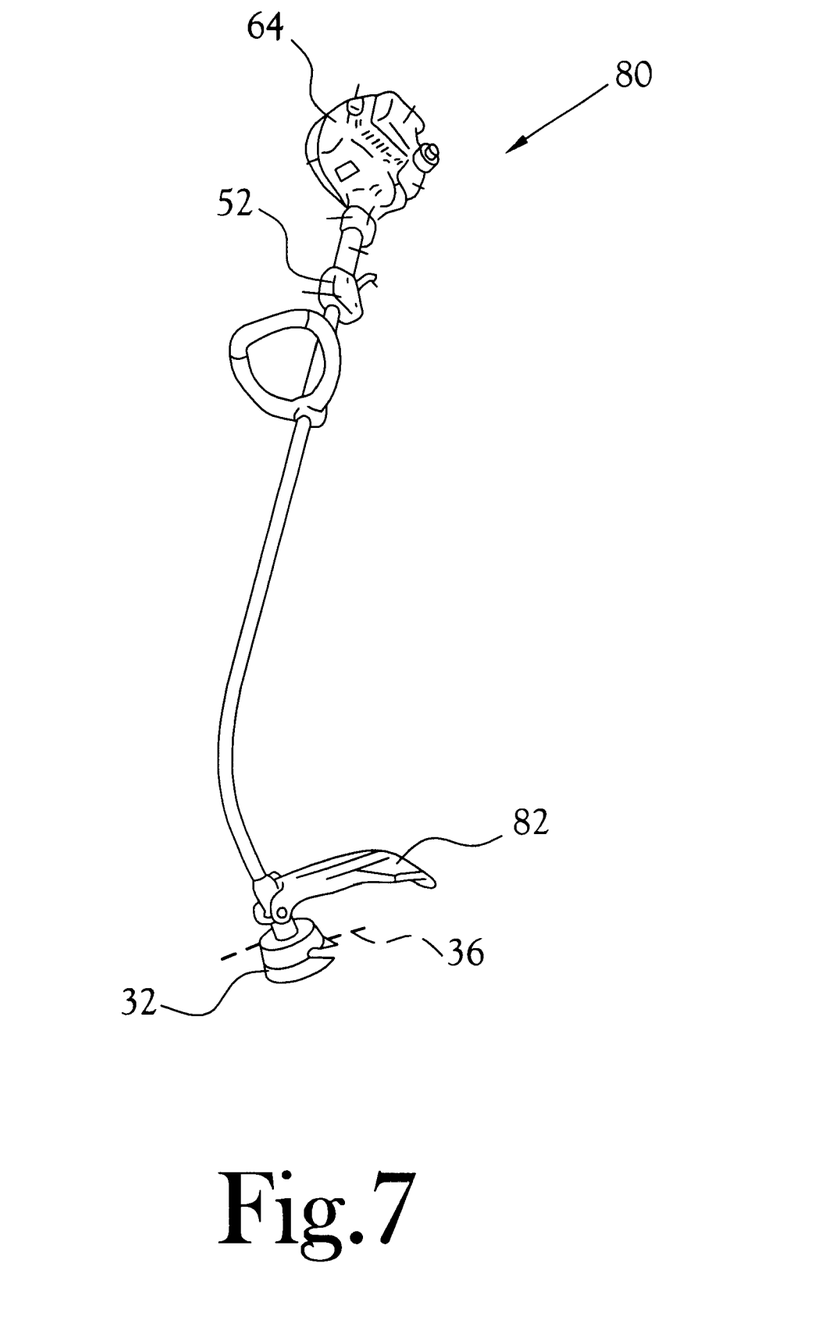
FIG. 7 is a perspective view of an alternative laser trimming means of a hand-held unit having a rotatable laser cutting means of the present invention.

A transport means is connectable to the housing, the transport means provides movement of the housing and the laser cutting means 30 along the surface covered by vegetation. The transport means can include a residential lawn and garden mowing tractor 74 (see FIG. 4), a walk-behind, push mower configuration 76 having a plurality of pairs of wheels connectable to the housing (see FIG. 5), or a commercial sized tractor 78 having a gasoline powered engine 68, storage batteries 66, drive wheels, and a separate platform for supporting one or more laser beam generators 30, 30', 30" (see FIG. 6). An additional alternative embodiment can include a portable, individual user-worn support harness connectable to an elongated support frame, and/or backpack harness for attachment to a light-weight, portable housing having a laser beam generator connected to the elongated support frame. The portable support frame and housing can include at least one laser beam generator that is transported by the user as a maneuverable hand-held laser cutting apparatus 80 having a semi-circular housing 82 enclosing the laser cutting means (see FIG. 7). One or more housings 12', 12", 12''' (see FIGS. 4 and 6) can be mounted at the front, underneath, or the rear of the mowing tractors 74, 78 with each housing including a plurality of laser beams 38, 40, 44, 46 (see FIG. 2) being generated by at least one laser beam generator 32 centrally positioned in each housing. One or more cutting widths can be provided by adjusting the angle of each pair of lasers in one housing, or alternatively adjusting angles of pairs of lasers in each housing, to provide about a eighteen inch to about a twenty-two inch cutting width for walk-behind mowers 76. For riding units 74, 78, two eighteen inch diameter housings can be combined side-by-side, or three or more housings can be combined side-by-side or staggered to provide about a thirty-six inch to about a sixty-six inch cutting width (not shown).

The control means 52 can include controls having a plurality of electrical and mechanical interfaces positioned proximate to the user operating position for each alternative embodiment. The electrical and mechanical interfaces provide user control of the rotation speed and angular direction of each laser generator 32 and end section 34, provide user control of the intensity of the laser beams, and can provide the user a visual indication of the ground speed and rotational speeds of the rotating laser beams. Electrical circuitry known to those skilled in the art can automatically increase the speed of rotation of the laser beam generator as the ground speed of the transport means increases to increase the rotation of the laser beams in proportion to the speed of travel across the surface covered by vegetation.

The constantly rotating laser beams can be separately controlled by the electrical and mechanical interfaces to allow user adjustments for landscape changes as the transport means 72 (see FIG. 6), housing(s) 12, 12', and laser beam generators 30, 30' moves along the surface covered by vegetation, thereby creating short and variable length clippings that provide improved aesthetics for the cut vegetation and improved mulching and decomposition of the cuttings. The laser cutting means 30 of the cutting apparatus 10 operates with reduced noise due to a lack of rotating cutting blades, and the potential to utilize a plurality of batteries for a power source. Additionally, the cutting apparatus 10 operates with a reduced number of moving mechanical parts thereby reducing maintenance requirements imposed on the user.

A number of associated electronic and mechanical components known to those skilled in the art are not illustrated, but can be incorporated without interfering with the objects and advantages of the present invention. A electrical generator 62 (see FIG. 5) can be sized appropriately to provide sufficient power to operate a plurality of laser beam generators 30, 30' (see FIG. 4) in separate housings 12, 12', each having a plurality of laser beams projected radially outwards within each housing 12, 12'.

A method of operation for cutting vegetation is disclosed, the method providing a rotating laser cutting system for cutting vegetation along a surface covered by vegetation. The method includes operations of providing a laser cutting system having at least one laser cutting beam being electrically powered, rotating the at least one laser cutting beam and positioning the cutting beam proximate the surface covered by vegetation. The rotating operation includes rotating the at least one pair of laser beams in an arc of generally 360°, and includes increasing the rotating speeds of the laser beams proportionally in response to increasing ground surface speeds of the laser cutting system. The method further includes providing at least one enclosure housing for the laser cutting system, transporting the laser cutting system by means of a transport platform along the surface at varying speeds, and controlling the rotational speed of the at least one rotating laser cutting beam as the laser cutting system is transported across the surface covered by vegetation. Adequate electrical power is provided to the laser cutting system to operate a plurality of pairs of laser beams, including up to about twelve pairs of laser beams, with each pair of laser beams being separately angled downward at angles other than horizontal thereby providing the plurality of pairs of laser beams with multiple cutting paths having different heights and widths across the vegetation during each rotation of the plurality of laser beams. The electrical power can be provided by batteries and/or an electrical generator attachable to the transport platform.

From the foregoing description, advantages will be recognized by those skilled in the art for the rotatable laser cutting apparatus and method of operating of the present invention. One advantage is that the plurality of pairs of rotating laser beams provide multiple cutting diameters, such as eighteen inch, twenty-two inch, and larger cutting diameters, along with multiple underneath, side-by-side and/or side oriented housings attachable to a transport platform. Another advantage is that the plurality of pairs of rotating laser beams are separately angled downward at angles other than horizontal thereby providing the plurality of pairs of laser beams with multiple cutting paths having different heights and widths across the vegetation during each rotation of the plurality of pairs of laser beams. The multiple cutting paths, variable cutting heights and variable widths of the plurality of rotating laser bears provide improved aesthetics for the remaining cut vegetation on surfaces traversed by the laser cutting system, and provides improved mulching and decomposition of the cuttings due to the multiple lengths of the cut vegetation.

While a preferred embodiment is shown and described, it will be understood that it is not intended to limit the disclosure, but rather it is intended to cover all modification and alternate methods falling within the spirit and the scope of the invention as defined in the appended claims. One skilled in the art will recognize variations and associated alternative embodiments. The foregoing description should not be limited to the description of the embodiment of the invention contained herein.

What is claimed is:

1. An apparatus for cutting vegetation, the apparatus controlled by a user for movement along a surface covered by vegetation, said apparatus comprising:

a housing including a first surface and at least one side wall being extended generally perpendicular and downwardly from said first surface, said housing having a second surface being faced in an opposed direction from said first surface, said housing having an opening being positioned downwardly and being bound by said at least one side wall, said opening being positioned proximate the vegetation being cut during operation;

a laser cutting means being powered to be rotatable while being positioned on said second surface within said housing;

at least one laser beam being generated by said laser cutting means, said at least one laser beam being rotatable during operation of said apparatus for cutting vegetation positioned proximate within said opening;

a control means positioned proximate said housing, said laser cutting means being controlled by said control means for speed of rotation and angular direction of said at least one laser beam;

a power means being detachably connected to said housing, said power means provides power to said laser cutting means; and a transport means being connectable to said housing, said transport means being movable by the user at a variable speed along the surface covered by vegetation while said laser cutting means and at least one laser beam rotates within said housing.

2. The apparatus for cutting vegetation of claim 1, wherein said at least one side wall further comprises a continuous side wall including interior surfaces faced inwardly, said second surface and said interior surfaces having a plurality of light absorbing materials being positioned thereon, said light absorbing materials being composed of material for absorbing said at least one laser beam being generated by said rotatable laser cutting means.

3. The apparatus for cutting vegetation of claim 2, wherein said laser cutting means comprises:

a laser beam generator being electrically powered and being rotatable at a speed being variable and being controlled by the user, said laser beam generator being adjustable in angular direction, said laser beam generator being positioned in a central position proximate said second surface, said laser beam generator being extended downwardly toward said opening;

said at least one laser beam being rotatable in a 360° arc at said speed being variable of said laser beam generator, said at least one laser beam being adjustable in a plurality of angles; and said speed being variable of rotation of said at least one laser beam being increased in proportion to increases in said transport means ground speed means, whereby said speed being variable of rotation of said at least one laser beam is increased as ground speed increases of said transport means across the surface covered by vegetation.

4. The apparatus for cutting vegetation of claim 3, wherein said control means further comprising an electrical interface being positioned proximate said first surface of said housing, said electrical interface being provided for user control of the rotatable movement of said laser beam generator, for user control of the intensity of said laser beam, and for user control of said plurality of angles of said at least one laser beam.

5. The apparatus for cutting vegetation of claim 4, wherein said laser beam generator further comprising a plurality of laser beams being generated by said laser beam generator, said plurality of laser beams being projected radially outwards from said laser beam generator, said plurality of laser beams being rotatable in a circle and each laser beam being separately adjustable in angular direction at angles other than horizontal.

6. The apparatus for cutting vegetation of claim 5, wherein said transport means comprises a plurality of wheels being rotatably connectable to said housing, said transport means including a control means and a drive means being connectable to said housing, said control means being maneuvered by the user for control of height of said housing, said drive means being controlled by the user for control of said plurality of wheels along the surface covered by vegetation.

7. The apparatus for cutting vegetation of claim 5, wherein said transport means comprises a backpack and support harness for connecting to said housing, said backpack and support harness being carried by the user for control of movement of said housing being transported proximate to the surface covered by vegetation.

8. The apparatus for cutting vegetation of claim 5, wherein said transport means comprises a plurality of wheels being rotatably connectable to and being driven by a motorized platform having said housing connectable thereto, said motorized platform including a plurality of controls for control of said motorized platform and control of said laser cutting means.

9. The apparatus for cutting vegetation of claim 5, wherein said speed being variable of rotation of said plurality of laser beams being automatically increased as ground speed increases for the cutting apparatus to provide adequate cutting of vegetation surface area in proportion to the ground speed of said transport means across the vegetation, said plurality of laser beams being separately angled downward at angles other than horizontal thereby said plurality of laser beams provide cutting paths having different heights and widths across the vegetation during each rotation of said plurality of laser beams.

10. An apparatus for cutting vegetation, the apparatus being controllable by a user for movement along a surface covered by vegetation, said apparatus comprising:

a housing including an upper surface having a plurality of side walls being extended generally perpendicular and downwardly therefrom, said housing having an enclosed surface being faced in an opposed direction from said upper surface, said housing being opened downwardly and having an opening being positioned proximate the surface covered by vegetation, said opening being bounded by said plurality of side walls;

a laser cutting means, said laser cutting means being electrically powered, said laser cutting means being rotatably positioned on said enclosed surface within said housing;

at least one laser beam being generated by said laser cutting means, said at least one laser beam being rotatable during operation of said apparatus for cutting vegetation positioned proximate within said opening;

a control means positioned proximate said housing, said laser cutting means being controlled by said control means for speed of rotation;

electrical power being provided by a power means being detachably connected to said housing, said electrical power being provided to said laser cutting means; and a transport means being connectable to said housing, said transport means being movable by the user at a variable ground speed along the surface covered by vegetation while said laser cutting means and at least one laser beam rotates within said housing.

11. The apparatus for cutting vegetation of claim 10, wherein said plurality of side walls further comprises a continuous side wall including interior surfaces faced inwardly, said enclosed surface and said interior surfaces having a plurality of light absorbing materials being positioned thereon, said light absorbing materials being composed of material for absorbing said at least one laser beam being generated by said rotatable laser cutting means.

12. The apparatus for cutting vegetation of claim 11, wherein said laser cutting means comprises:

a laser beam generator being rotatable at a speed being variable, said at least one laser beam being rotatable in angular direction in a plurality of angles by said laser beam generator, said laser beam generator being positioned in a central position proximate said enclosed surface;

said at least one laser beam being rotatable in a 360° arc at said speed being variable, said at least one laser beam being adjustable in said plurality of angles downwardly toward said opening; and said speed being variable of said at least one laser beam being increased as the ground speed of said transport means is increased, whereby the rotation of said at least one laser beam is increased in proportion to increasing ground speed of said transport means across the surface covered by vegetation.

13. The apparatus for cutting vegetation of claim 12, wherein said at least one laser beam further comprising a plurality of laser beams being generated by said laser beam generator, said plurality of laser beams being projected radially outwards from said laser beam generator, said plurality of laser beams being rotatable in a circle and each laser beam being separately adjustable in angular direction at angles other than horizontal.

14. The apparatus for cutting vegetation of claim 13, wherein said speed being variable of rotation of said plurality of laser beams being automatically increased as ground speed increases for the cutting apparatus to provide adequate cutting of vegetation surface area in proportion to the ground speed of said transport means across the vegetation, said plurality of laser beams being separately angled downward at angles other than horizontal thereby said plurality of laser beams provide cutting paths having different heights and widths across the vegetation during each rotation of said plurality of laser beams.

15. A method of operation for cutting vegetation, providing a rotating laser system being movable across a vegetation covered surface, said method comprising:

providing a laser cutting system including at least one pair of laser beams being electrically powered;

enclosing said at least one pair of laser beams in a central position within a housing having a downward directed opening;

rotating said at least one pair of laser beams in an arc of generally 360°, said rotating operation increasing a rotating speed of said at least one pair of laser beams proportionally in response to increasing ground speeds of said laser cutting system;

directing said at least one pair of laser beams at a plurality of angles for cutting vegetation at varying heights when said housing is positioned proximate said vegetation;

transporting said laser cutting system at varying speeds along the vegetation covered surface, said transporting operation providing a transport platform for moving said at least one pair of rotating laser beams enclosed within a housing generally parallel to the vegetation covered surface;

controlling the speed of rotation of said at least one pair of laser beams; and providing continuous electrical power to said laser cutting system for rotating said at least one pair of laser beams at rotating speed proportionally increasing in response to increasing ground speeds of the rotating laser system.

16. The method of claim 15, wherein said operation of directing said at least one pair of laser beams further comprises projecting a plurality of pairs of laser beams radially outwards from a rotating laser beam generator positioned in a central position within said housing, said projecting operation rotating said plurality of pairs of laser beams in a plurality of arcs of generally 360°, said each pair of laser beams being separately adjustable in angular direction at angles other than horizontal, thereby providing cutting paths having different heights and widths during rotation of said plurality of laser beams.

17. The method of claim 16, wherein said operation of controlling further comprises increasing the rotating speeds of each pair of laser beams proportionally as ground speed increases for said moving transport platform, thereby providing adequate cutting of vegetation surface area in proportion to the ground speed of said moving transport platform across the vegetation covered surface.

* * * * *